US012603895B2

(12) United States Patent
Anderson et al.

(10) Patent No.: US 12,603,895 B2
(45) Date of Patent: Apr. 14, 2026

(54) PACKET METADATA CAPTURE IN A SOFTWARE-DEFINED NETWORK

(71) Applicant: Cisco Technology, Inc., San Jose, CA (US)

(72) Inventors: Blake Harrell Anderson, Chapel Hill, NC (US); David McGrew, Poolesville, MD (US)

(73) Assignee: Cisco Technology, Inc., San Jose, CA (US)

( * ) Notice: Subject to any disclaimer, the term of this patent is extended or adjusted under 35 U.S.C. 154(b) by 105 days.

(21) Appl. No.: 16/724,746

(22) Filed: Dec. 23, 2019

(65) Prior Publication Data

US 2021/0194894 A1 Jun. 24, 2021

(51) Int. Cl.
*H04L 9/40* (2022.01)

(52) U.S. Cl.
CPC ...... *H04L 63/1416* (2013.01); *H04L 63/0236* (2013.01); *H04L 63/1425* (2013.01); *H04L 63/166* (2013.01)

(58) Field of Classification Search
CPC ..... H04L 63/00; H04L 63/14; H04L 63/1408; H04L 63/0227; H04L 63/0236; H04L 63/1425; H04L 63/166; H04L 63/0421
USPC .......................................................... 726/13
See application file for complete search history.

(56) References Cited

U.S. PATENT DOCUMENTS

| | | | | |
|---|---|---|---|---|
| 8,813,197 | B2 * | 8/2014 | Sabin | H04L 67/10 726/8 |
| 9,860,154 | B2 | 1/2018 | Balabine et al. | |
| 10,142,353 | B2 | 11/2018 | Yadav et al. | |
| 10,230,599 | B2 | 3/2019 | Pietrowicz et al. | |
| 10,237,068 | B2 | 3/2019 | Dara et al. | |
| 10,341,748 | B2 | 7/2019 | Anand et al. | |
| 10,362,373 | B2 | 7/2019 | Anderson et al. | |
| 11,108,819 | B2 * | 8/2021 | Anderson | H04W 12/02 |
| 2010/0050256 | A1 * | 2/2010 | Knapp | G06F 21/552 370/252 |
| 2012/0230210 | A1 | 9/2012 | Reed | |
| 2013/0275631 | A1 * | 10/2013 | Magro | G06F 13/16 710/28 |

(Continued)

FOREIGN PATENT DOCUMENTS

| | | | | | |
|---|---|---|---|---|---|
| CN | | 110650012 A | * | 1/2020 | ........... H04L 9/3263 |
| EP | | 3407563 A1 | | 11/2018 | |

OTHER PUBLICATIONS

Wijeratne, Scalable High Performance SDN Switch Architecture on FPGA for Core Networks, Oct. 30, 2019 (Year: 2019).*

(Continued)

*Primary Examiner* — Lynn D Feild
*Assistant Examiner* — Saad Ahmad Abdullah
(74) *Attorney, Agent, or Firm* — Lee & Hayes, P.C.

(57) ABSTRACT

In one embodiment, a switch in a software-defined network receives a packet sent by an endpoint device via the SDN. The switch makes a copy of the packet based on one or more header fields of the packet matching one or more flow table entries of the switch. The switch forms telemetry data for reporting to a traffic analysis service by applying a metadata filter to the copy of the packet. The metadata filter prevents at least a portion of the copy of the packet from inclusion in the telemetry data. The switch sends the formed telemetry data to the traffic analysis service.

20 Claims, 8 Drawing Sheets

(56)            References Cited

U.S. PATENT DOCUMENTS

| | | |
|---|---|---|
| 2014/0029451 A1* | 1/2014 | Nguyen .................. H04L 43/50 |
| | | 370/252 |
| 2015/0372910 A1 | 12/2015 | Janakiraman et al. |
| 2015/0373039 A1 | 12/2015 | Wang |
| 2016/0191545 A1* | 6/2016 | Nanda ..................... H04L 43/20 |
| | | 726/1 |
| 2017/0019417 A1* | 1/2017 | McGrew ................. H04L 43/20 |
| 2017/0201810 A1* | 7/2017 | Anderson ............. H04L 63/102 |
| 2017/0250913 A1* | 8/2017 | Huang ................... H04L 45/32 |
| 2017/0374028 A1* | 12/2017 | Oliver ................ H04L 63/1416 |
| 2019/0104442 A1* | 4/2019 | Witzel .................. H04W 36/08 |
| 2019/0312904 A1* | 10/2019 | Stevens, IV ........ H04L 63/1433 |
| 2020/0053064 A1* | 2/2020 | Oprisan .................. H04L 47/22 |
| 2022/0278930 A1* | 9/2022 | Györgyi ................ H04L 43/065 |

OTHER PUBLICATIONS

Cao et al., "Fingerprinting SDN Applications via Encrypted Control Traffic", Usenix Association, 22nd International Symposium on Research in Attacks, Intrusions and Defenses, Aug. 23, 2019, pp. 501-515.

Jarraya et al., "A Survey and a Layered Taxonomy of Software-Defined Networking", hit.bme.hu, IEEE Communication Surveys & Tutorials, vol. 16, No. 4, Fourth Quarter 2014, Apr. 24, 2014, 1955-1980.

Michel, Oliver, "Packet-Level Network Telemetry and Analytics", eric-keller.github.io, University of Colorado, Department of Computer Science, 2019, 133 pages.

Phan et al., "SDN-Mon: Fine-Grained Traffic Monitoring Framework in Software-Defined Networks", Journal of Information Processing vol. 25 , 182-190, Feb. 2017, 9 pages.

Suarez-Varela et al.,"A NetFlow/IPFIX implementation with OpenFlow", 2017, 3 pages.

"Encrypted Traffic Analytics in Software-Defined Access Deployment Guide", Cisco Systems, Inc., Jul. 2019, 60 pages.

"OpenFlow Switch Specification", Open Networking Foundation, Version 1.3.1, Sep. 6, 2012, 128 pages.

International Search Report issued on Feb. 22, 2021 in connection with International Patent Application No. PCT/US2020/063896.

International Preliminary Report on Patentability for International Application No. PCT/US2020/063896, mailed Jul. 7, 2022, 08 Pages.

Office Action for European Application No. 208284950, dated Feb. 29, 2024, 5 Pages.

* cited by examiner

700

705

START

710

RECEIVE PACKET AT SDN SWITCH

715

MAKE COPY OF PACKET

720

FORM TELEMETRY DATA BY APPLYING METADATA FILTER

725

SEND TELEMETRY DATA TO TRAFFIC ANALYSIS SERVICE

730

END

PACKET METADATA CAPTURE IN A SOFTWARE-DEFINED NETWORK

TECHNICAL FIELD

The present disclosure relates generally to computer networks, and, more particularly, to packet metadata capture in a software-defined network (SDN).

BACKGROUND

Beyond the various types of legitimate application traffic in a network, some network traffic may also be malicious. For example, some traffic may seek to overwhelm a service by sending a large number of requests to the service. Such attacks are also sometimes known as denial of service (DoS) attacks. Other forms of malicious traffic may seek to exfiltrate sensitive information from a network, such as credit card numbers, trade secrets, and the like. Typically, such traffic is generated by a client that has been infected with malware. Thus, further types of malicious network traffic include network traffic that propagate the malware itself and network traffic that passes control commands to already infected devices. However, many instances of malware now use encryption, to conceal their network activity from detection.

With the proliferation of advanced machine learning techniques, it is now possible to discern the contents of encrypted network traffic, or its intent (e.g., by distinguishing between malware-related traffic and benign traffic), without actually decrypting the traffic. However, doing so still requires the collection of sufficient telemetry from the network regarding the encrypted traffic. This telemetry collection is often non-trivial and can, in some cases, actually impede on the operations of the network due to the additional overhead.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
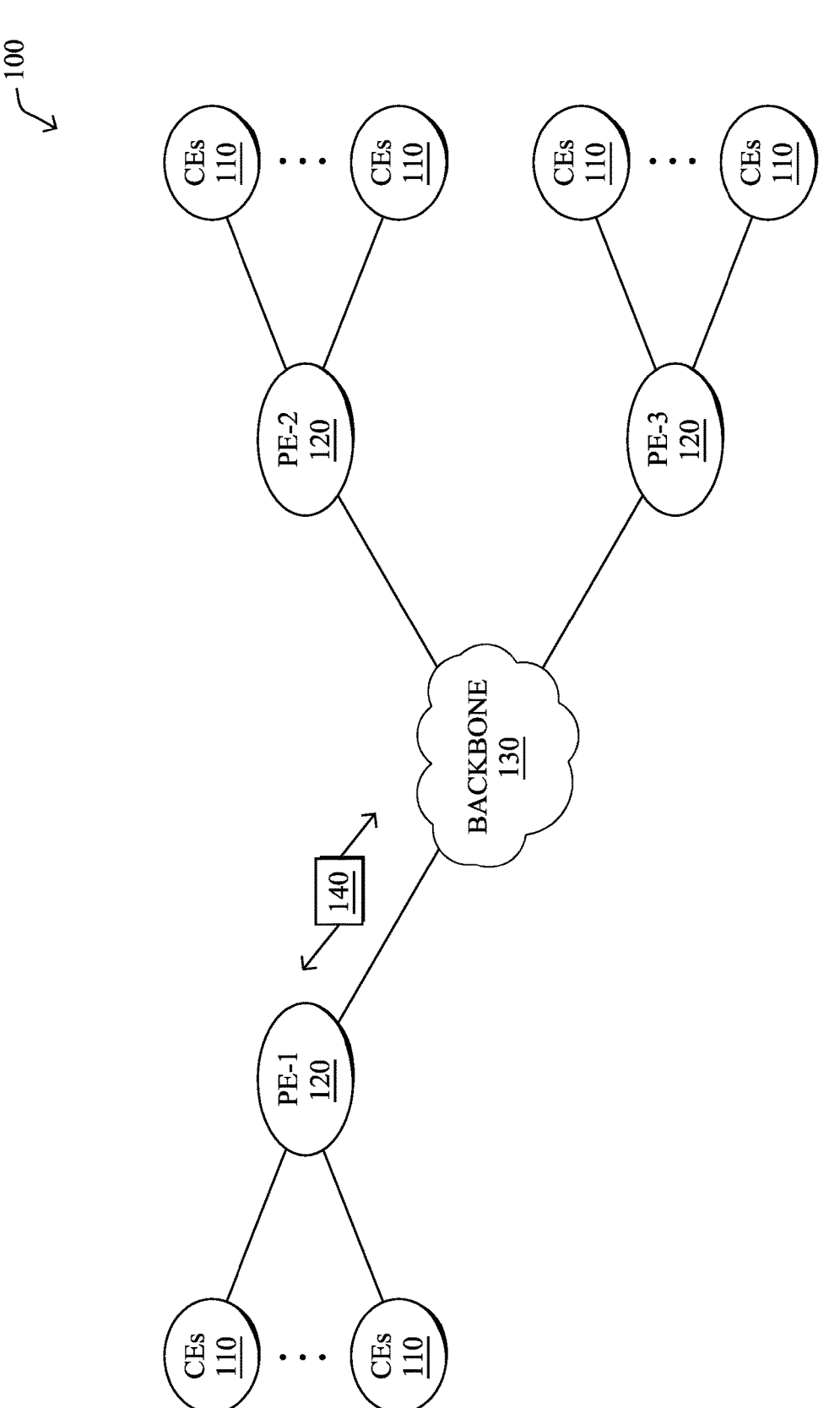
FIGS. 1A-1B illustrate an example communication network.

According to one or more embodiments of the disclosure, a switch in a software-defined network receives a packet sent by an endpoint device via the SDN. The switch makes a copy of the packet based on one or more header fields of the packet matching one or more flow table entries of the switch. The switch forms telemetry data for reporting to a traffic analysis service by applying a metadata filter to the copy of the packet. The metadata filter prevents at least a portion of the copy of the packet from inclusion in the telemetry data. The switch sends the formed telemetry data to the traffic analysis service.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/ Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
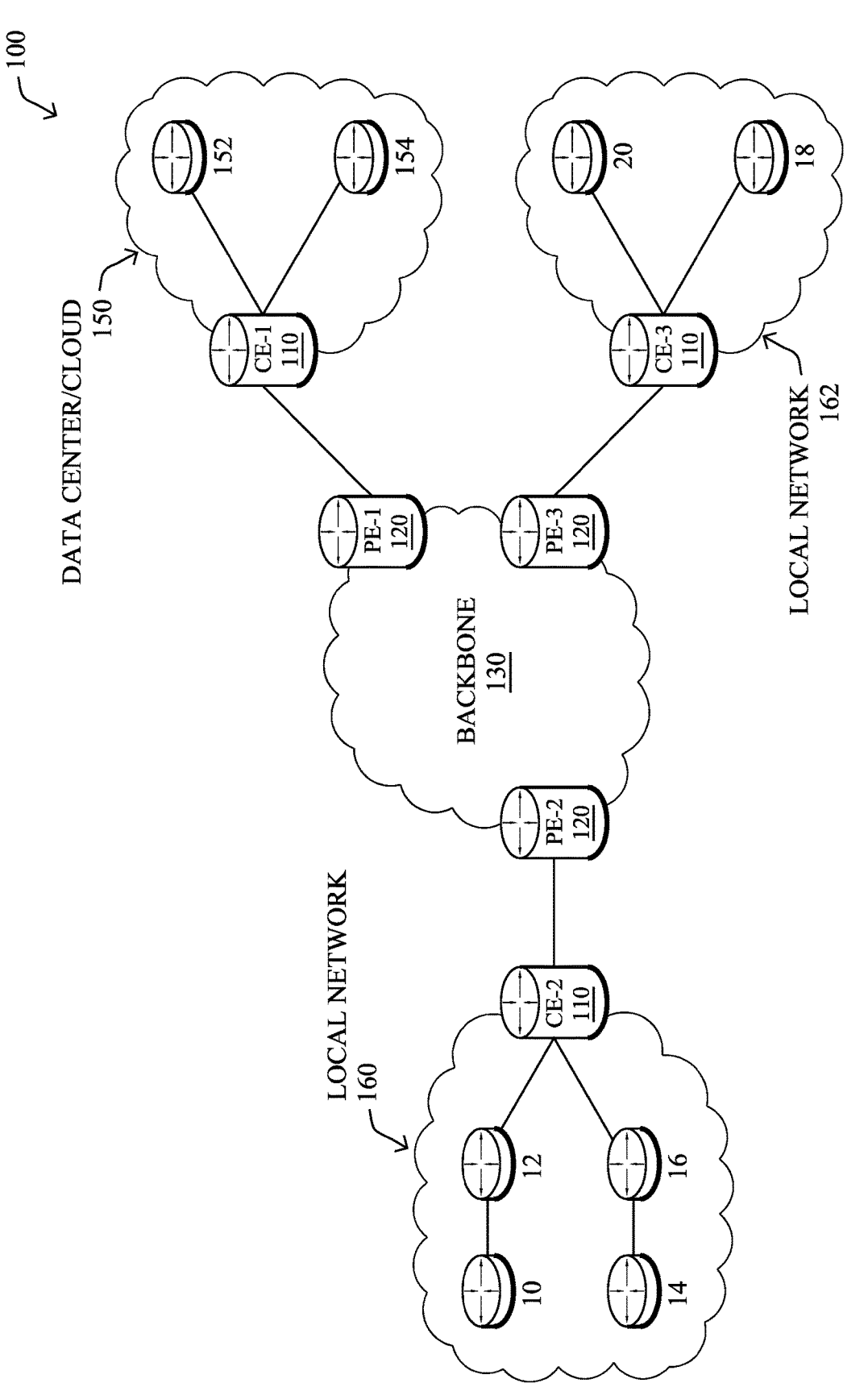

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
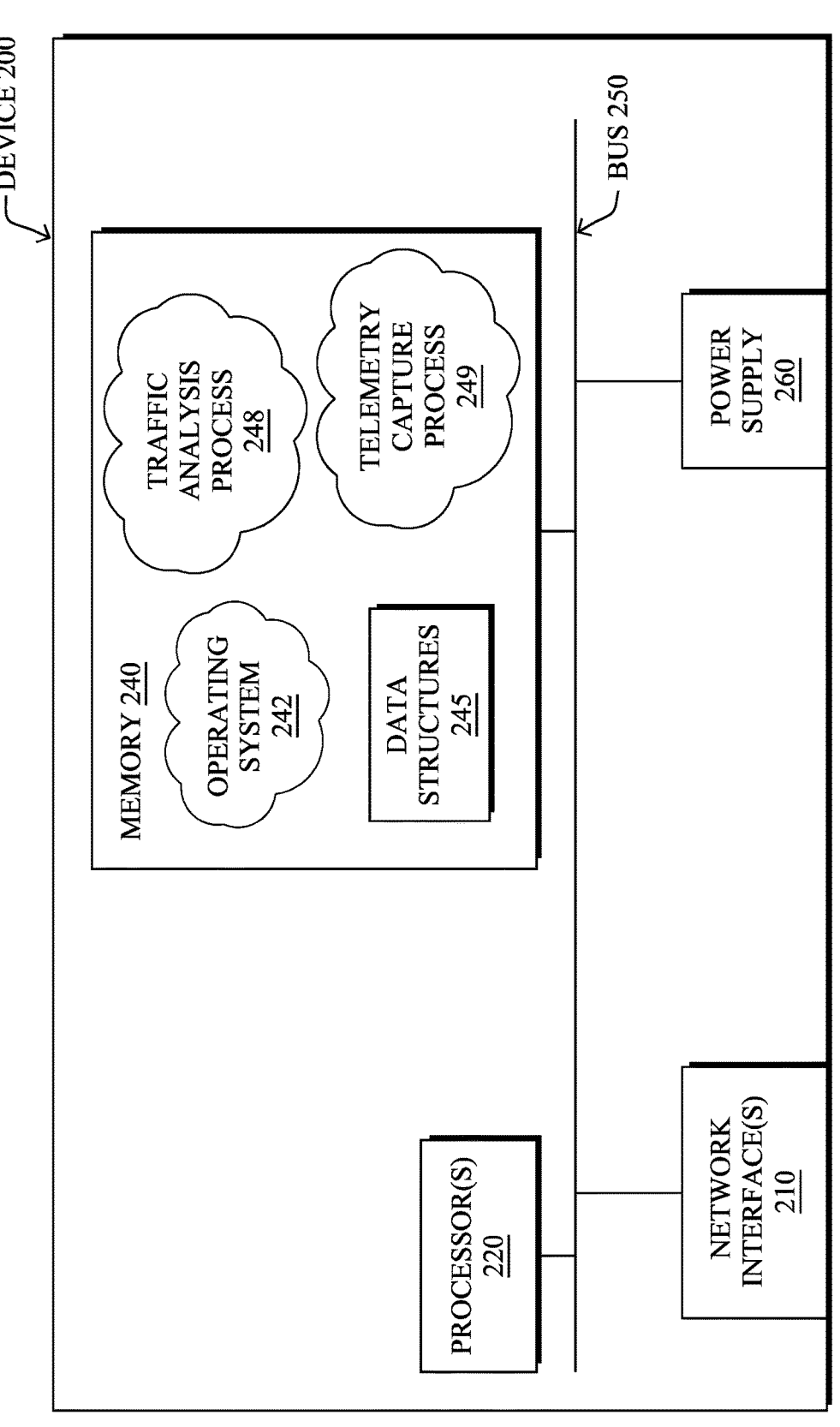
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a traffic analysis process 248 and/or a telemetry capture process 249.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, traffic analysis process 248 may execute one or more machine learning-based classifiers to classify encrypted traffic in the network (and its originating application) for any number of purposes. In one embodiment, traffic analysis process 248 may assess captured telemetry data (e.g., captured by telemetry capture process 249) regarding one or more traffic flows, to determine whether a given traffic flow or set of flows are associated with malware in the network, such as a particular family of malware applications. Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a zero day attack or denial of service (DoS) attack, combinations thereof, or the like. In further embodiments, traffic analysis process 248 may classify the gathered telemetry data to detect other anomalous behaviors (e.g., malfunctioning devices, misconfigured devices, etc.), traffic pattern changes (e.g., a group of hosts begin sending significantly more or less traffic), protocol or application identification, passive operating system fingerprinting, or the like.

Traffic analysis process 248 may employ any number of machine learning techniques, to classify the gathered telemetry data. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, traffic analysis 248 can use the model M to classify new data points, such as information regarding new traffic flows in the network. Often, M is a statistical model, and the cost function is inversely proportional to the likelihood of M, given the input data.

In various embodiments, traffic analysis process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data for encrypted traffic that has been labeled as "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that traffic analysis process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, convolutional neural networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-associated, anomalous, etc. Conversely, the false negatives of the model may refer to the number of traffic flows that the model incorrectly classifies as normal, when actually malware-associated, anomalous, etc. True negatives and positives may refer to the number of traffic flows that the model correctly classifies as normal or malware-associated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, traffic analysis process 248 may assess the captured telemetry data on a per-flow basis. In other embodiments, traffic analysis 248 may assess telemetry data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Figure 3:
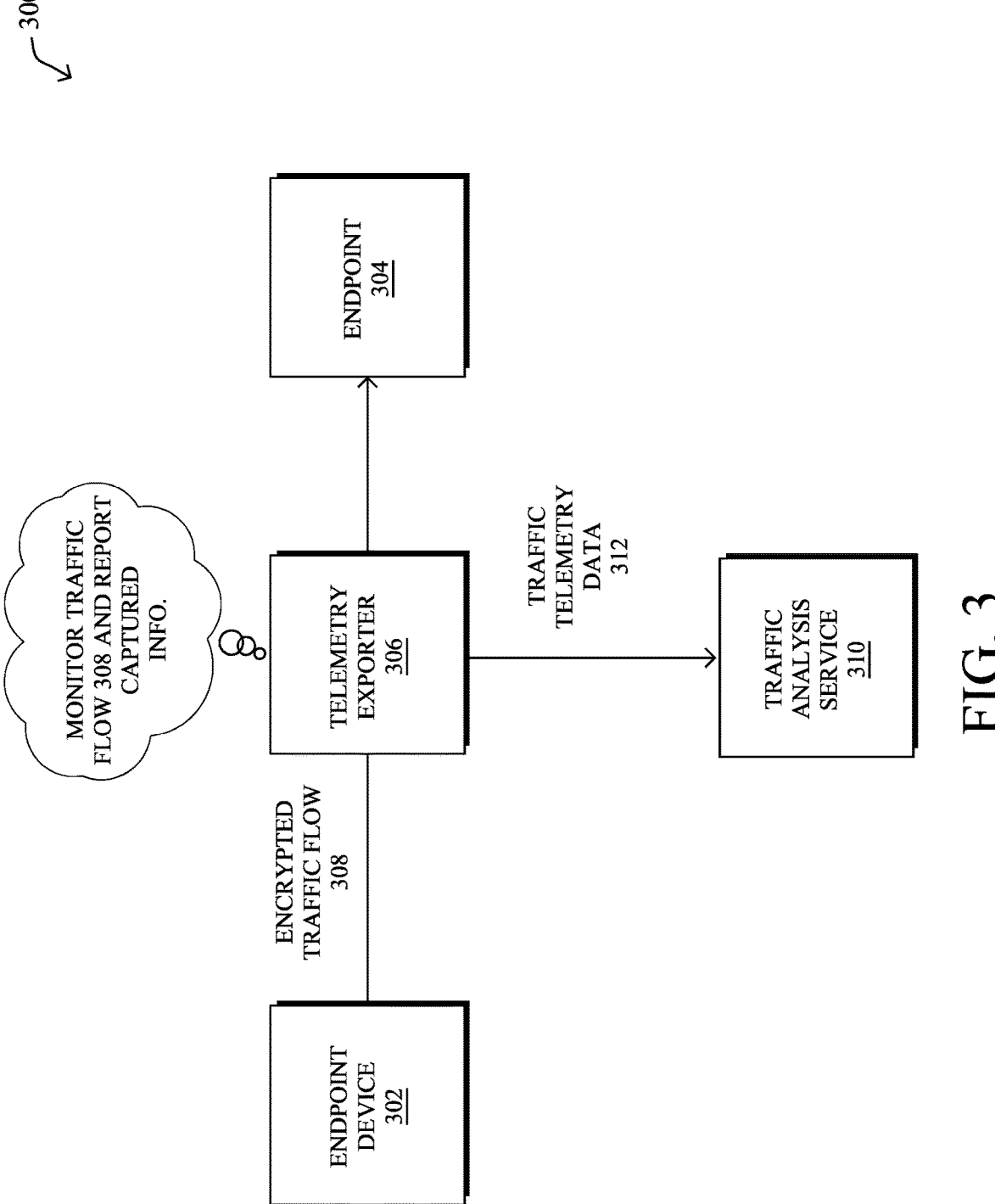
FIG. 3 illustrates an example architecture for the analysis of traffic in a network.

FIG. 3 illustrates an example architecture for the analysis of traffic in a network, according to various embodiments. As shown in FIG. 3, assume that a network 300 includes an endpoint device 302 that communicates with another remote endpoint 304 via network 300. For example, in many cases, endpoint device 302 may be a client device that communicates with a remote server or service via the network 300. More specifically, endpoint device 302 may form a traffic session with endpoint 304 and send traffic flow 308 towards endpoint 304 via the network.

Located along the network path between endpoint device 302 and endpoint 304 may be any number of telemetry exporters, such as telemetry exporter 306. For example, telemetry exporter 306 may be a switch, router, firewall, server, network controller, or other networking equipment via which traffic flow 308 sent between endpoint device 302 end endpoint 304 flows. During operation, traffic telemetry exporter 306 may capture data regarding traffic flow 308, generate traffic telemetry data 312 based on the captured data, and send traffic telemetry data 312 to traffic analysis service 310 for assessment. For example, traffic telemetry data 312 may include Internet Protocol Flow Information Export (IPFIX) records and/or Netflow records regarding traffic flow 308. In further cases, traffic telemetry data 312 may include one or more captured packets from traffic flow 308, such as the first n-number of data packets of flow 308.

More specifically, telemetry exporter 306 may analyze the packet headers of traffic flow 308, and any associated flows in the opposite direction), to capture feature information about the traffic. For example, telemetry exporter 306 may capture the source address and/or port of endpoint device 304, the destination address and/or port of endpoint 304, the protocol(s) used by the packets of traffic flow 308, or other header information by analyzing the header of a given packet in traffic flow 308. Example captured features may include, but are not limited to, Transport Layer Security (TLS) information (e.g., from a TLS handshake), such as the ciphersuite offered, user agent, TLS extensions (e.g., type of encryption used, the encryption key exchange mechanism, the encryption authentication type, etc.), HTTP information (e.g., URI, etc.), Domain Name System (DNS) information, or any other data features that can be extracted from the observed traffic flow 308.

In further embodiments, telemetry exporter 306 may also assess the payload of the packet to capture information about the traffic flow. For example, telemetry exporter 306 may perform deep packet inspection (DPI) on one or more of the packets of traffic flow 308, to assess the contents of the packet. Doing so may, for example, yield additional information that can be used to determine the application associated with the traffic flow (e.g., the packets of flow 308 were sent by a web browser of endpoint device 304, traffic flow 308 was sent by a videoconferencing application, etc.). However, as would be appreciated, a traffic flow may also be encrypted, thus preventing telemetry exporter 306 from assessing the actual payload of the packet. In such cases, the characteristics of the application can instead be inferred from the captured header information.

Telemetry exporter 306 may also compute any number of statistics or metrics regarding the traffic flow 308 for inclusion in traffic telemetry data 312. For example, telemetry exporter 306 may determine the start time, end time, duration, packet size(s), the distribution of bytes within flow 308, etc. In further examples, telemetry exporter 306 may capture sequence of packet lengths and time (SPLT) data regarding the traffic flow 308, sequence of application lengths and time (SALT) data regarding the traffic flow 308, or byte distribution (BD) data regarding traffic flow 308.

In various embodiments, network 300 may also include a traffic analysis service 310 that is implemented by one or more devices in network 300 through the execution of traffic analysis process 248. For example, in some cases, traffic analysis service 310 may be implemented by one or more devices in the local network of endpoint device 302. However, in further cases, traffic analysis service 310 may be implemented as a cloud service that is in communication with telemetry exporter 306 and endpoint device 302, either directly or indirectly.

During operation, traffic analysis service 310 may make any number of assessments of traffic flow 308. Notably, the characteristics of flow 308 can be used as input to one or more machine learning-based classifiers that are configured to make assessments such as whether flow 308 is malware-related (e.g., is propagating malware or malware commands), is attempting to exfiltrate data from the local network of client device 302, whether traffic flow 308 is using authorized security parameters (e.g., a particular TLS version, etc.) as part of a crypto audit, or for other determinations. A key aspect of the techniques herein is that the application of a machine learning classifier to telemetry data 312 allows traffic analysis service 310 to make inferences about traffic flow 308, even if the traffic between endpoint device 302 and endpoint 304 is encrypted. Indeed, the captured packet header information, packet timing information, and the like, traffic analysis service 310 may determine whether the traffic is malicious, is associated with a particular application, or the like.

Based on the assessment of traffic flow 308, traffic analysis service 312 may cause any number of mitigation actions to be performed in network 300. For example, traffic analysis service 312 may block or drop traffic flow 308. In more extreme cases, traffic analysis service 312 may prevent all future traffic in network 300 associated with endpoint device 302 and/or endpoint 304. In yet another example, traffic analysis service 312 may send a notification to a user interface that is indicative of the assessment of traffic flow 308 by traffic analysis service 312. For example, traffic analysis service 312 may notify a network administrator, if endpoint device 302 is suspected of being infected with malware.

As noted above, the collection of telemetry data regarding encrypted traffic creates additional overhead on the network. This is particularly true in the case in which a telemetry exporter simply captures copies of the encrypted packets and exports the packets for analysis. For example, this is typically done for the initial n-number of data packets of a flow (e.g., the first ten packets), which include valuable information for purposes of classifying the encrypted traffic.

Many network implementations are shifting towards software-defined networking, which presents both challenges and opportunities with respect to capturing and exporting traffic telemetry data. A key distinction between a traditional network and a software-defined network (SDN) is that control plane decisions are centralized in an SDN with an SDN controller, while control plane decisions in a traditional network are made in a decentralized manner. By centralizing the management of the network with a controller, control plane decisions can be made in an SDN in a more intelligent manner that takes into account the entire network.

Packet Metadata Capture in a Software-Defined Network (SDN)

The techniques herein introduce a telemetry collection system for an SDN that allows for the collection of packet metadata in a selective, intelligent, and context-aware manner, and without requiring a separate representation/format for the metadata, Through the use of a packet metadata filter, only the metadata needed by the traffic analysis service is reported, and stored, greatly reducing the resource consumption by telemetry collection system.

Specifically, according to one or more embodiments of the disclosure as described in detail below, a switch in a software-defined network receives a packet sent by an endpoint device via the SDN. The switch makes a copy of the packet based on one or more header fields of the packet matching one or more flow table entries of the switch. The switch forms telemetry data for reporting to a traffic analysis service by applying a metadata filter to the copy of the packet. The metadata filter prevents at least a portion of the copy of the packet from inclusion in the telemetry data. The switch sends the formed telemetry data to the traffic analysis service.

Illustratively, the techniques described herein may be performed by hardware, software, and/or firmware, such as in accordance with the traffic analysis process 248 and telemetry capture process 249, which may include computer executable instructions executed by the processor 220 (or independent processor of interfaces 210) to perform functions relating to the techniques described herein.

Figure 4:
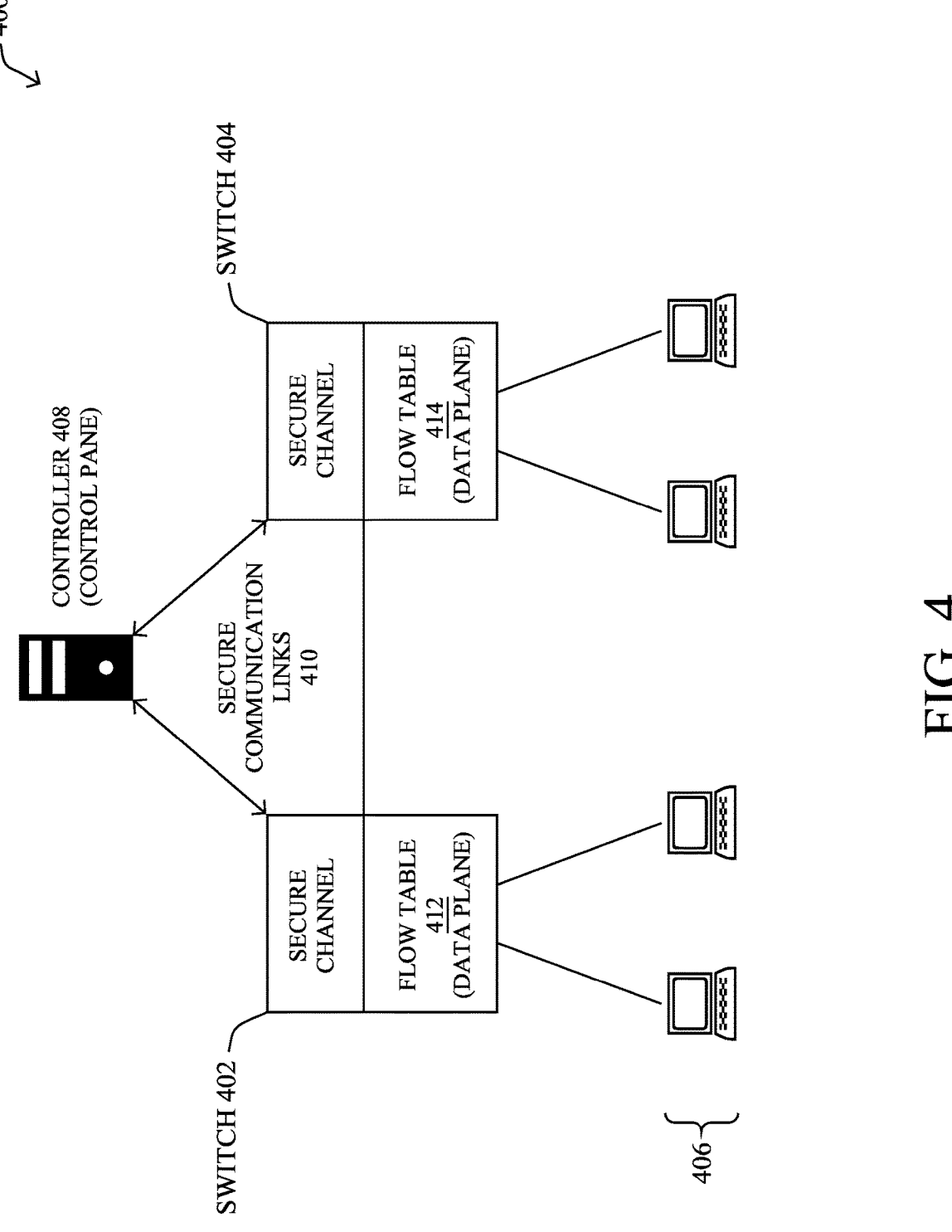
FIG. 4 illustrates an example software-defined network (SDN)

Operationally, FIG. 4 illustrates an example SDN 400. As shown, SDN 400 may comprise any number of endpoints 406, any number of switches (e.g., switches 402-404), and an SDN controller 408. A key feature of an SDN architecture is that control plane decisions are made in a centralized manner by controller 408. Data plane decisions are still made at the switch level, as in a traditional network.

Each of switches 402-404 may include one or more flow tables 412, 414, respectively, that are configured by controller 408 via secure communication links 410 between controller 408 and switches 402-404. For example, communication links 410 may comprise OpenFlow channels that are encrypted using TLS. Each of the flow tables 412-414 include a set of flow entries, with each flow entry indicating the following:

Match field(s)—these are used by the switch to identify specific types of packets that include header fields that match those of the match fields in the flow entry.

Counter(s)—these are maintained by the switch to track the number of packets that match the flow entry.

Instruction(s)—these specify what actions the switch should take with respect to packets that match the match field(s) of the flow entry. For example, the instruction(s) in a certain flow entry may specify the port via which the switch should forward a matching packet, any changes that the switch should make to the packet (e.g., swapping headers, etc.), and the like. In some cases, the switch may also perform the instructions with the aid of a group table that maintains sets of 'action buckets' that are applied to the matching packets.

In the case in which a switch 402-404 receives a packet that does not match any flow entry, the switch may take a default action with respect to the packet. For example, the switch may forward the packet to controller 408, drop the packet, or take any other configured default action.

With respect to capturing and exporting telemetry data in an SDN, IPFIX and Netflow can be configured to record summary representations of the traffic. For example, such record information may indicate the source and destination IP addresses, TCP/UDP ports, the start and stop times of each session, protocol information, as well as byte and packet counts. This summary data is quite compact relative to the full packets and is sufficient for some types of traffic analysis.

Unfortunately, many types of traffic analysis require more information than that afforded by IPFIX and Netflow records. For example, passive DNS monitoring, TLS client fingerprinting, and the other traffic classification tasks above all fall within this category. Indeed, certain machine learning-based traffic analysis services today also require the export of packet copies to the service for the first n-number of packets of a traffic flow. Typically, the first ten or so packets are sufficient for purposes of classifying the traffic. Thus, one challenge in an SDN is how to export the packet copies to the traffic analysis service and in a manner that does not deplete network resources.

Figure 5:
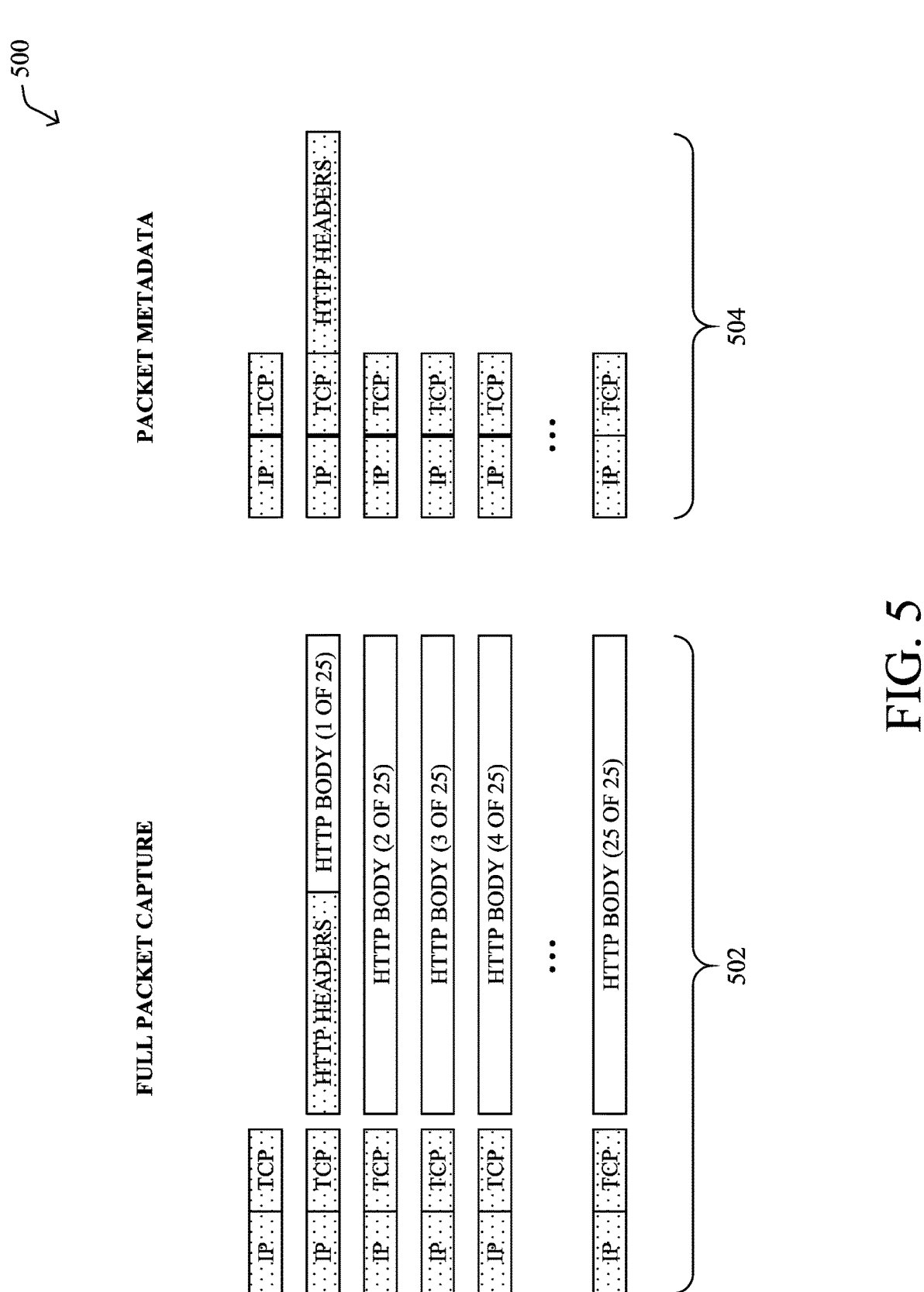
FIG. 5 illustrates an example comparison of the full packets captured by a telemetry exporter to the packet metadata actually needed by a traffic analysis service.

A key observation herein is that, while the exporting of full packet copies to a traffic analysis service enables the service to perform certain types of traffic classifications, much of the exported packets are largely ignored during the analysis. For example, FIG. 5 illustrates an example 500 comparing the full packets 502 captured by a telemetry exporter to the packet metadata 504 actually needed by the traffic analysis service. Indeed, network session metadata such as TCP/IP headers, HTTP headers, TLS handshake information, and DNS responses is information-rich and can be useful for traffic analysis purposes such as detecting malware, operating system fingerprinting, application identification, etc. Another important type of metadata for traffic analysis is message information such as message headers and the lengths, types, and arrival times of messages.

Figure 6:
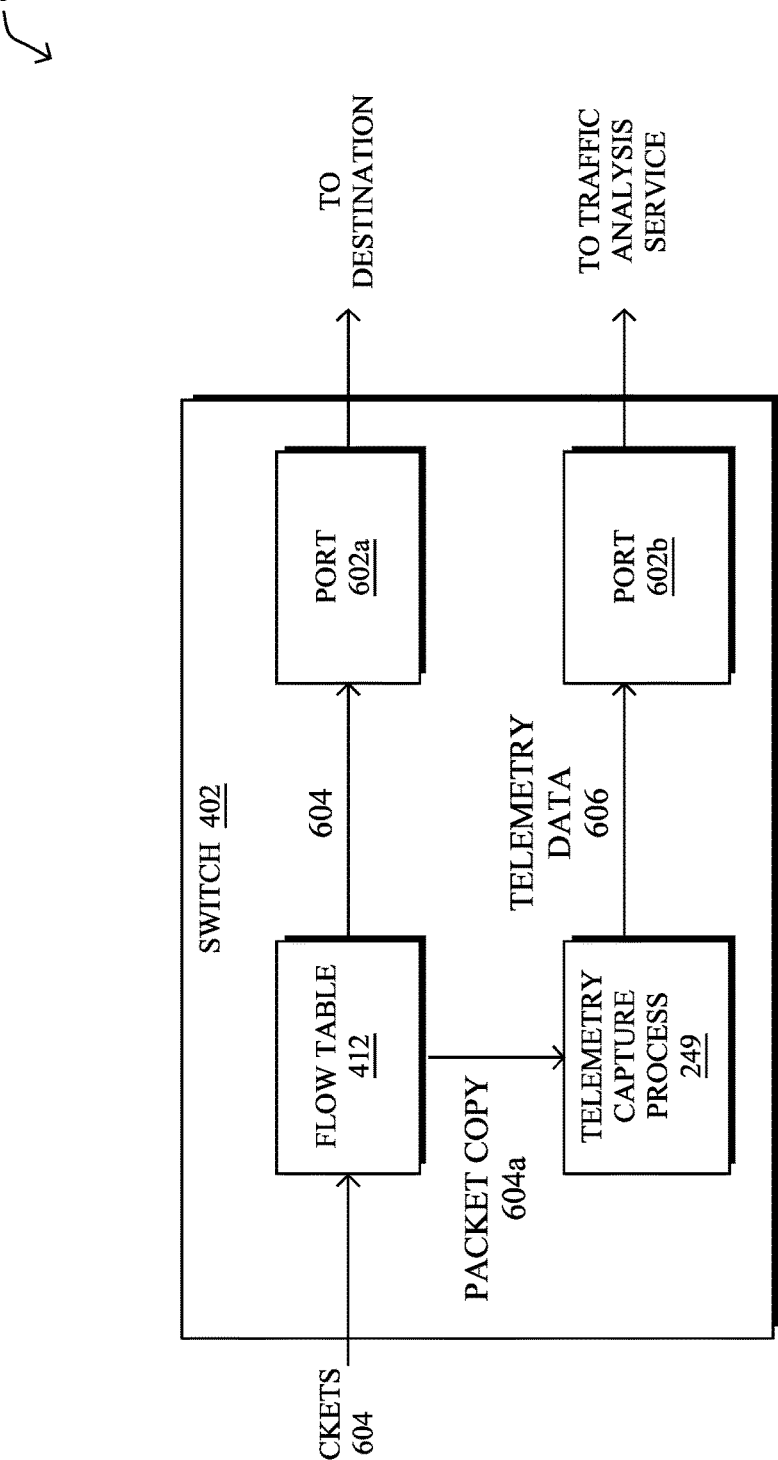
FIG. 6 illustrates an example architecture for capturing packet metadata in an SDN.

FIG. 6 illustrates an example architecture 600 for capturing packet metadata in an SDN, according to various embodiments. As shown, a given switch, such as SDN switch 402, may include the following components: a flow table 412, ports 602a-602b, and telemetry capture process 249, in various embodiments. In further implementations, the functionalities of these components may be combined or omitted, as desired. In addition, these components may be implemented by a singular device or multiple devices operating in conjunction with one another.

During operation, assume that switch 402 receives a packet 604 sent by an endpoint device in the SDN towards another endpoint device via switch 402. In addition to the forwarding operations that switch 402 may perform with respect to packet 604, switch 402 may be further configured as a telemetry exporter to provide traffic telemetry data 606 to a traffic analysis service for classification.

In various embodiments, switch 402 can be enabled as a telemetry exporter in the SDN, in part, through the use of specialized flow entries in flow table 412. More specifically, the SDN controller overseeing switch 402 in the SDN may create one or more flow entries in flow table 412 of switch 402 to indicate the types/characteristics of packets that are to be captured by switch 402 for purposes of reporting telemetry data 606 to a traffic analysis service for analysis. More specifically, the SDN controller overseeing switch 402 may specify the header field(s) or other packet characteristics of a packet to be captured as match field(s) of a flow entry in flow table 412. In further embodiments, the flow entries in flow table 412 set by the controller for purposes of telemetry reporting may further specify that such packets should be copied.

By way of example, assume that packet 604 is an initial data packet of a TCP handshake and that an entry in flow table 412 indicates that the packet should be copied. In such a case, switch 402 may create a packet copy 604*a* for further processing by telemetry capture process 249. With respect to the original packet 604, another entry in flow table 412 may cause switch 402 to process packet 604 as normal. For example, as shown, switch 402 may send packet 604 on to port 602*a* for forwarding towards the intended destination of packet 604.

As would be appreciated, the match fields and flow entries in flow table 412 can be configured to capture packet copies of packets having any desired packet type. For example, flow entries in flow table 412 may be configured to copy all packets with TCP headers, UDP headers, TLS headers, HTTP headers, DNS headers, or the like. In some cases, the match field(s) of a flow entry in flow table 412 may further specify that only certain subsets of such packets should be copied. For example, only the first n-number of packets of a flow should be captured, only headers having certain header values should be captured (e.g., specific IP addresses, certain TLS extensions, etc.).

In general, telemetry capture process 249 is configured to form telemetry data 606 for reporting to the traffic analysis service, based on the captured packet copies. In the simplest case, this may entail telemetry capture process 249 simply including packet copy 604*a* in telemetry data 606, which is forwarded on to the traffic analysis service via port 602*b*. However, as noted, the traffic analysis service may not actually require the entirety of packet 604, but may only need certain header metadata from packet copy 604*a*, to classify the traffic.

According to various embodiments, telemetry capture process 249 may apply a packet metadata filter to packet copy 604*a*, to form telemetry data 606, according to a corresponding filter policy. Such a packet metadata filter may function as a truncating filter that, given a packet copy 604*a*, truncates it to an appropriate length, resulting in a truncated version of the packet 604 for inclusion in telemetry data 606.

Since the truncated packet copies sent to the traffic analysis service as part of telemetry data 606 are much smaller in size than that of the complete packet copies, the overall resources consumed by the telemetry exporting mechanism will be greatly reduced. Indeed, the packet data discarded by the packet metadata filter of telemetry capture process 249 may be much larger in size than the remaining metadata of the packet. For example, telemetry capture process 249 may discard sensitive, private information (e.g., the body of an HTTP message) or unintelligible data, such as the ciphertext fields/encrypted payloads of encrypted packets.

In addition, traffic metadata is often less sensitive in nature than the contents of a given packet copy 604*a*, making it easier to anonymize. When user privacy is a concern, in some embodiments, the packet metadata filter of telemetry capture process 249 may also apply an anonymization technique to the truncated packet copy, such as by encrypting the address information in the truncated packet.

To more formally describe the packet metadata filtering operations of telemetry capture process 249 assume that a given packet can be represented as a byte string. In such a case, let $P_n$ denote the set of all possible packets with lengths up to n. A packet sequence $p_1, p_2, \ldots, p_l$, $$p_1, p_2, \ldots, p_l \epsilon P_n^l$$

represents a unidirectional communication between a sender and one or more receivers, whose identities are excluded from this notation for clarity. When p is a byte string, p[i] denotes its $i^{th}$ byte, wherein the first byte is indexed 0, and p[i:j] denotes the substring of bytes i through j.

Generally, the packet sequences of interest for purposes of traffic classification by a traffic analysis service are those sent in a single flow, which are logically associated and all share the same flow key and occur within the same timespan. A function $k:P_n \rightarrow K$ maps a packet to an element of the set K of flow keys. For a packet flow $p_1, p_2, \ldots, p_l, k(p_1)=k(p_2)= \ldots k(p_l)$. Informally, the value returned by the key function serves as a label that identifies the flow to which a packet belongs. For conventional TCP/IP, UDP/IP, and ICMP, k is 5-tuple consisting of the IP source and destination addresses, IP protocol number, and TCP/UDP source and destination ports. For non-TCP/UDP protocols, the ports are nil.

Each traffic flow may have a flow record associated with it that stores flow-specific state information. Accordingly, let $r_j$ denote a flow record with key j and R denote the set of possible records. In some embodiments, the packet metadata filter of telemetry capture process 249 may be configured to store state information within such flow records, for purposes of applying filtering to the packet copies. Alternatively, the packet metadata filter of telemetry capture process 249 may operate in a stateless manner, in a further embodiment. Further, a given flow record can store the capturing/done state within a single bit. However, it is sometimes desirable to avoid storing even a single bit per flow (e.g., because the amount of available fast memory is insufficient, etc.). To further reduce the amount of state required in stateful filtering by the metadata filter, while not accidentally discarding metadata, the filter could employ the use of a Bloom filter to record when a flow is in a packet 'capturing' state or a 'done' state, in one embodiment. Then, when a flow enters a capturing state, the filter may increment the Bloom counter and decrement the counter, when entering the done state.

A packet metadata filter policy may be formally defined as a function $f:P_n xR \rightarrow \{1,0\}$ that defines which packets of filter. When applying the filter policy to a given packet copy 604*a*, the packet metadata filter of telemetry capture process 249 may effectively apply a truncation function $g:P_n xR \rightarrow \{1, n\}$ that indicates how many bytes of the prefix of the packet are of interest.

In addition, let protocol G represent a probabilistic source of packets with memory. That is, G is determined by the conditional distribution $P_G[p_i|p_1, p_2, \ldots, p_{i-1}]$. If I represents the set of known protocols, a protocol identification function $$h_g: P_n^l \rightarrow I^*$$

will then indicate that one or more protocols that match a sequence of l-number of packets. This function has the property that $h(p_1, p_2, \ldots, p_l)=G$ for any $p_1, p_2, \ldots, p_l$ where $P_G[p_i|p_i, p_2, \ldots, p_l] \geq \epsilon$. Also implicit to this definition is the fact that multiple protocols may generate the same packet sequence. Therefore, the parameter $\epsilon$ allows the packet metadata filter of process 249 to ignore ones whose likelihood is low. Note that this formalization neglects the arrival times of the packets and also implicitly assumes that all of the packets are observed within a limited timespan.

For a protocol G, the set of possible metadata elements is denoted M, and the metadata extracting function of the packet metadata filter of telemetry capture process 249 can be formalized as $e_G{:}p_1, p_2, \ldots, p_l{\rightarrow}M_G$. Pseudocode for the application of the protocol identification function by the packet metadata filter of telemetry capture process 249 is as follows:

Return true if $\Omega<\Omega'$
  $G{\leftarrow}h_\varepsilon(p_1, p_2, \ldots, p_l)$
  return $e_G(p_1, p_2, \ldots, p_l)$ In some embodiments, the packet metadata filter of telemetry capture process 249 may combine truncation functions, to filter a packet copy 604a. Formally, for any two truncation functions $g_a$, $g_b{:}P_n x R{\rightarrow}\{0, n\}$, their conjugation can be denoted as $g_a{\wedge}g_b$ and is defined as $g_c{=}g_a{\wedge}g_b$ where $g_c(p){=}max(g_a(p), g_b(p))$. That is, the conjugation of two truncation functions is one that accepts as many bytes of a packet as either of them.

Example filter policies for the packet metadata filter of telemetry capture process 249 may include, but are not limited to, the following:

TABLE 1

| Name | Metadata Included |
|---|---|
| Minimal TCP | IP + TCP headers (SYN, FIN, RST only) |
| Full TCP | IP + TCP headers (all) |
| TCP Initial Message | TCP data before ACK advance, in each direction |
| Minimal [D]TLS | Handshake records |
| Full [D]TLS | Handshake records, all record types and lengths |
| HTTP | Version, command, headers, magic |
| UDP | IP + UDP headers |
| DNS | IP + UDP headers, DNS responses |

In various embodiments, the configuration of a filter policy for telemetry capture process 249 can be achieved in a number of ways. In some embodiments, the SDN controller overseeing switch 402 may provide a filter policy to switch 402, in addition to the corresponding flow entry for flow table 412. In other embodiments, the filter policy for telemetry capture process 249 may be provided to switch 402 by the traffic analysis service or another supervisory service for switch 402. For example, if changes are made to the machine learning classifier of the traffic analysis service (e.g., to assess a different input dataset), the service may send an updated filter policy to switch 402.

From Table 1 above, the HTTP metadata filter policy may require the HTTP command, protocol, and headers from heat request, as well as the 'magic' first several bytes of the body and similar data for each response. The DNS metadata filter policy may require the entirety of each DNS response packet and none of the request packets. For the [D]TLS policies, minimal and full policies are defined. Under the minimal policy, the packet metadata filter of telemetry capture process 249 may capture only the ContentType values of packets of the handshake, which includes clientHello, serverHello, and clientKeyExchange values, as well as change_cipher_spec, and alert values. The full [D]TLS policy may include the ContentType, Protocol Version, and length fields from each TLSCiphertext record that appears at the beginning of a TCP Data filed. Those TLS fields comprise the first five bytes of the record. Note that a single TLS record may span multiple TCP packets, or multiple records may appear in a single packet. In general, TLS records are not guaranteed to appear at the start of a TCP Data field, meaning that the packet metadata filter of telemetry capture process 249 may parse all of the records by moving forward as per the length field of the previous record. The TLS policies may similarly be divided into full and minimal policies whereby the full policy requires the TCP/IP headers from each packet, including IP and TCP options, while the minimal TLS policy may require that data only for the packet copy 604a for which the SYN, FIN, and RST flags are set.

The TCP initial message policy may be applied by telemetry capture process 249 to all packets captured in the client-to-server direction that contain one or more bytes of the initial application message, and the equivalent server-to-client packets. The packet metadata filter of telemetry capture process 249 may identify such packets based on the assumption that when a TCP-based application protocol is used synchronously, all of the TCP packets in the same direction share the same Acknowledgement number as part of the same application message. Pseudocode for application of the TCP initial message policy by the packet metadata filter of telemetry capture process 249 is as follows, in one embodiment:

```
if the packet is the first in a flow then
    set S and A to nil
endif
if p.SYN = 1 then
    S ← p.S
return #p
endif
if p.ACK = 1 then
    A ← p.A
endif
if p.ACK = 0 and (A=nil or p.A = A) then
    return #p
endif
if p.S > S and p.A = A then
    return #p
endif
return 0
```

More specifically, a TCP initial message filter policy may cause telemetry capture process 249 to include, for each TCP session between endpoints, the initial message in each direction, as part of telemetry data 606. As a result, telemetry data 606 may include all of the data for messages that extend over multiple TCP/IP packets. This is particularly important for purposes of analyzing traffic that uses TLS or HTTP, but can also be useful for the analysis of traffic that uses unknown protocols, as well. In the case of TLS, for example, the most important initial message for purposes of analysis is the TLS serverHello/serverCertificate.

In various embodiments, switch 402 may enforce a TCP initial message filter policy by applying either or both of the following mechanisms:

A Boolean filter—this filter may simply control whether a particular TCP packet is included in telemetry data 606 without alteration. This can be applied either at the flow table level or, alternatively, at telemetry capture process 249 (e.g., by dropping all but the initial packets of a TCP flow).

A reconstruction filter—in this case, the packet metadata filter of telemetry capture process 249 may merge together the data segments of all of the TCP/IP packet copies spanned by the initial message, creating a single TCP/IP packet that represents what the endpoint would have sent if it hadn't needed to fragment the packet.

Generally speaking, a Boolean filter may be simpler and perform better, while a reconstruction filter provides more functionality. In one embodiment, if the Boolean filter is confused due to packet loss, retransmissions, etc., it may default to a 'fail open' mode whereby it gathers all initial packets, even if doing so means capturing spurious packets, as well.

As would be appreciated, in a synchronous TCP connection, the server listens while the client talks, and vice-versa. When a client talks, it sends TCP packets with incrementing Sequence Number (Seq) fields, and the server sends TCP packets with incrementing Acknowledgement Number (Ack) fields (and unchanging sequence numbers and zero-length data fields) to indicate that it heard the message. Server-to-client Seq and Ack values are mirror images of the client-to-server Seq and Ack values. In other words, to acknowledge receipt of a packet with Seq=S, a packet with Ack=S is sent. The SYN flag is considered to logically take up one byte of the TCP data stream. Typical TCP behavior is to use a 'relative sequence number' in which the Seq and Ack that have their initial values subtracted out.

A TCP message is defined as the set of TCP/IP packets for which the ACK flag is set, the Ack value is constant, and the Seq is incrementing. In the TCP initial message, the relative Ack of the first packet is equal to 1, or the relative Seq of the first packet is equal to 1, or both. In a typical session, the client's initial message has both the relative Seq and Ack of the first packet equal to one, and the server's initial message has only the Seq equal to 1.

To identify the initial message from the server, switch 402 may simply look at the relative sequence number of a packet. If the relative sequence number is '1,' then telemetry capture process 249 (or a flow entry in flow table 412) may opt to capture that packet. Similarly, subsequent packets of the initial server message can be identified based on their acknowledgement numbers matching that of the first message packet from the server. The following illustrates an example TCP session, omitting the TCP handshake:

TABLE 2

| Src | Dst | Seq | Ack | Len | Notes |
|---|---|---|---|---|---|
| 42708 | 443 | 1 | 1 | 313 | client initial message (1 of 1) |
| 443 | 42708 | 1 | 313 | 0 | |
| 443 | 42708 | 1 | 313 | 1460 | server initial message (1 of 3) |
| 42708 | 443 | 314 | 1460 | 0 | |
| 443 | 42708 | 1461 | 313 | 1036 | server initial message (2 of 3) |
| 42708 | 443 | 314 | 2496 | 0 | |
| 443 | 42708 | 2497 | 313 | 793 | server initial message (3 of 3) |
| 42708 | 443 | 314 | 3289 | 0 | |
| 42708 | 443 | 314 | 3289 | 126 | |

The Seq and Ack fields use arithmetic modulo $2^{32}$. Thus, the following preprocessor definitions can be used to compare those fields, in some embodiments:

define LT(X, Y) ((int)((X)−(Y))<0)
define LEQ(X, Y) ((int)((X)−(Y))<=0)
define GT(X, Y) ((int)((X)−(Y))>0)
define GEQ(X, Y) ((int)((X)−(Y))>=0)

A retransmitted TCP packet can be ignored by switch 402, if its data field has the same length as the previous packet, but it is important to check for that. In addition, a TCP packet containing a retransmission of a previous segment could also contain additional data, which may also be checked.

In one embodiment, a Boolean filter can be implemented by tracking the Seq and Ack numbers for each active traffic flow. This will require a large hash table, which is indexed using a hash of the flow key. It may be useful to have a hash function definition that is symmetric in how it handles addresses and ports, so that both the client-to-server and server-to-client flow keys hash to the same data structure.

Doing so could minimize storage and help to reduce computation. In addition, each worker thread may maintain its own flow table, to avoid read/write contention.

In further embodiments, switch 402 may identify the initial messages of protocols of interest (e.g., TLS, HTTP) and parse enough of the packets to determine whether they are complete or not. Such a mechanism is referred to herein as a 'completion test,' and can be implemented with relatively minimal packet parsing. For TLS packets, this requires only understanding the TLS Record type and length fields, and for HTTP packets, involves only scanning for the 0x0D0A0D0A four-byte sequence. For example, a protocol-aware filter of process 249 can identify a TCP packet copy containing a TLS serverHello and serverCertificate message, test to see whether it is complete, and if not, create a flow table entry in flow table 412 that indicates that additional packets in the flow are needed. The flow table 412 is checked to see whether additional packets are needed in a given flow, and those packets are checked to see if they complete the TCP message. If they do, then process 249 may delete the flow table entry in table 412.

Generally speaking, a protocol-aware approach might offer better performance and scalability, as compared with a protocol-agnostic approach that only looks at TCP headers, because its flow table is much smaller. In addition, the flow table will include an entry for a flow only during the handshake and only if the initial message was not in a single packet. The latency of looking up a flow table entry for each packet is the dominating cost for many packet-processing systems, so it would be a big performance boost to fit the entire flow table into the memory cache.

Truncation of a copy of a packet copy 604a by the packet metadata filter of telemetry capture process 249 generally requires that it have enough awareness about the protocol(s) in its applied filter policy to be able to identify the start of each new session. To do so, in various embodiments, the packet metadata filter of telemetry capture process 249 may attempt to match a given packet copy 604a against a pattern using a rooted keyword tree, with each node of the tree being associated with a single byte of one or more keywords. This approach minimizes the number of operations that it needs to perform for the match. In another embodiment, the filter may employ a multiple string-matching implementation, for protocol identification. In yet another embodiment, filter may employ a 'mask and match' scheme to test the equality of substrings that appear in the first x-number of bytes of a payload (e.g., first 8 or 16 bytes). Example strings that filter 602 may employ for protocol identification may include, but are not limited to, any or all of the following:

TABLE 3

| Protocol | Direction | Hex String | Notes |
|---|---|---|---|
| TLS (443) | C | 160301****01 | ClientHello v1.0 |
| | | 160302****01 | ClientHello v1.1 |
| | | 160303****01 | ClientHello v1.2 |
| | | 160301****02 | ClientHello v1.0 |
| | | 160302****02 | ClientHello v1.1 |
| | | 160303****02 | ClientHello v1.2 |
| HTTP (80) | C | 47455426 | 'GET' |
| | | 504f535420 | 'POST' |
| | | 4f5054494f4e5320 | 'OPTIONS' |
| | | 4845414420 | 'HEAD' |
| | | 50555420 | 'PUT' |
| | | 44454c45544520 | 'DELETE' |
| | | 545241434520 | 'TRACE' |
| | | 434f4e4e45435420 | 'CONNECT' |

TABLE 3-continued

| Protocol | Direction | Hex String | Notes |
|---|---|---|---|
| | S | 485454502f312e3120 | 'HTTP/1.1' |
| SSH (22) | — | 5353482d322e302d | 'SSH-2.0' |
| DNS (53) | C | ****010000010000 | Query |
| DNS (53) | S | ****818000010000 | Response |
| DHCP (67) | C | 01010600 | REQUEST |
| DHCP (68) | S | 02010600 | REPLY |

The start of a new TCP flow can be recognized by the packet metadata filter of telemetry capture process 249 by the SYN flag in the handshake. When a TCP SYN or SYN/ACK packet copy 604a is observed, the packet metadata filter of telemetry capture process 249 may create a new flow record and record the (initial) sequence number. When a non-SYN packet copy 604a is observed, process 249 may process the TCP payload as follows. First, process 249 may apply protocol identification to the packet copy 604a. If the protocol is TLS, then filter 602 may parse the packet copy 604a as a stream of records. If the length of the record exceeds that of the packet copy 604a, filter 602 may store the next sequence (NextSEQ) at which record-parsing should resume. Filter 602 may then keep a record of the highest TCP sequence number that has been processed (accepted) so far. If a TCP packet copy 604a then arrives with a lower sequence number, the packet metadata filter of telemetry capture process 249 may copy that packet in its entirety for inclusion in telemetry data 606.

Stateless filtering can also be implemented by copying the entire packet, if the initial 16-byte prefix of the TCP payload is in the following 97-character character-set that can appear in HTTP headers of packets:

, !, ", #, $, %, &, ', (,), *, +, ,, -, ., /, 0, 1, 2, 3, 4, 5, 6, 7, 8, 9, :, ;, <, =, >, ?, @, A, B, C, D, E, F, G, H, I, J, K, L, M, N, O, P, Q, R, S, T, U, V, W, X, Y, Z, [,], ∧, ', a, b, c, d, e, f, g, h, i, j, k, l, m, n, o, p, q, r, s, t, u, v, w, x, y, z, {, |,}, ~, or if that prefix consists of HTTPS characters up to the pattern CRLFCRLF. Otherwise, process 249 may truncate the packet copy 604a. Because most HTTP 1.1 traffic uses a compressed encoding, this will capture all of the HTTP headers, while discarding almost all traffic with a compressed encoding (e.g., a 16-byte prefix). HTTP text encoding, however, may be copied. Process 249 can also implement a stateless filter for TLS traffic using a simple rule: copy only packets other than those whose TCP or UDP data fields start with the pattern 17030, which indicates TLS data records. A similar pattern can be used by filter 602 to match SSL, as well.

Note that there are two ways in which the packet metadata filter of telemetry capture process 249 may fail, when presented with a given packet copy 604a containing l≥0 bytes of metadata. In a first case, filter 602 could return m>1 bytes, in which case p[m−l:m] is the residual data. In a second case, it could return m such that 0≤m≤1, in which case p[m:l] is referred to herein as lost data. The efficiency of the truncation by the packet metadata filter of telemetry capture process 249 can then be quantified in terms of the expected number of bytes of residual data and its failure rate by the expected number of bytes of lost data with respect to a particular traffic distribution.

In one embodiment, telemetry data 606 may take the form of a packet capture (PCAP) file that includes the metadata specified by the filter policy applied by process 249 and a minimum of other data. Such a PCAP file may store the sequence of packet copies processed by telemetry capture process 249, which may have been truncated during processing, each of which may be associated with a timestamp and an indication of the number of bytes in the packet and how many bytes were actually captured and copied.

In another embodiment, telemetry data 606 may be flow-organized such that a stream of packets from multiple flows are captured and then multiplexed into multiple streams of packets, each containing packets from a single flow. To do so, process 249 may apply its filtering to a flow-organized capture, or by reversing those steps. When the filter policy includes the network or transport headers for many packets, process 249 may also apply header compression to the packets in each packet flow. Alternatively, process 249 may apply a compression algorithm, such as DEFLATE, to all of the packet data in the packet flow reported via telemetry data 606. For example, in one embodiment, process 249 may apply header compression to the outputs of its packet metadata filter and/or by compressing the entire output telemetry data 606, such as by forming a .gz file, .zip file, or the like.

As a result of the techniques herein, telemetry data 606 may include the packet metadata (e.g., header information, etc.) of packets captured by switch 402 that is needed by traffic analysis service and in a truncated manner. This greatly reduces the amount of telemetry data conveyed across the network and eliminates the transmission of unneeded information to the traffic analysis service. It is also important to note that the decision to include metadata from a given packet can be made at the flow table level and/or by telemetry capture process 249. For example, a flow entry in flow table 412 may specify that copies of all packets with TLS headers should be sent to telemetry capture process 249, which then decides what information, if any, should be included in telemetry data 606.

Figure 7:
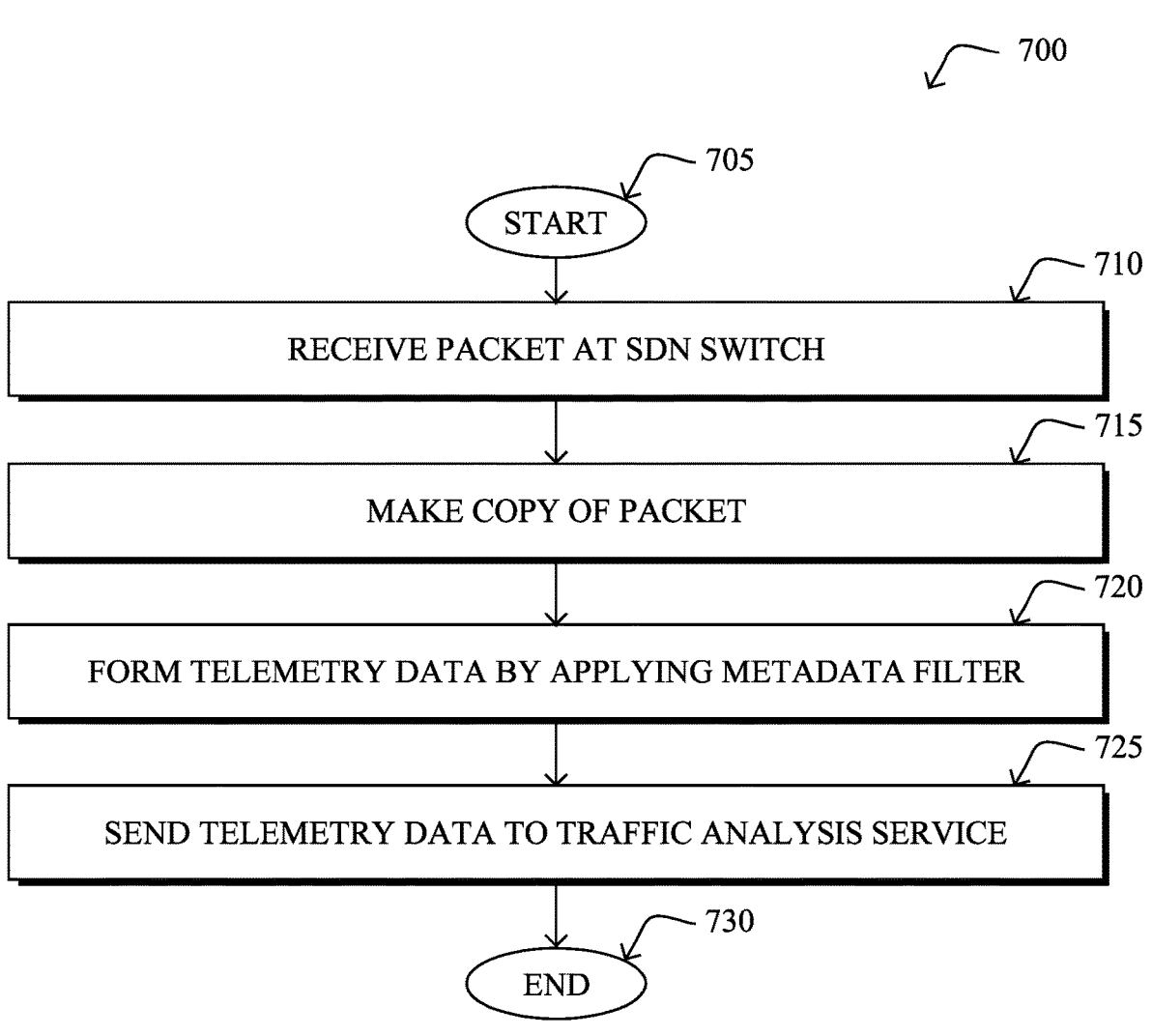
FIG. 7 illustrates an example simplified procedure for packet metadata capture in an SDN.

FIG. 7 illustrates an example simplified procedure for packet metadata capture in an SDN, in accordance with one or more embodiments described herein. For example, a non-generic, specifically configured device (e.g., device 200) may perform procedure 700 by executing stored instructions (e.g., telemetry capture process 249), such as a switch in an SDN. The procedure 700 may start at step 705, and continues to step 710, where, as described in greater detail above, the switch may receive a packet sent by an endpoint device via the SDN.

At step 715, as detailed above, the switch may make a copy of the packet based on one or more header fields of the packet matching one or more flow table entries of the switch. For example, a given flow table entry may be indicative of one or more TLS header fields (e.g., copy the packet if it has a TLS header, copy the packet if it has a specified ciphersuite in its TLS header, etc.).

At step 720, the switch may form telemetry data for reporting to a traffic analysis service by applying a metadata filter to the copy of the packet, as described in greater detail above. In various embodiments, such a metadata filter may prevent at least a portion of the copy of the packet from inclusion in the telemetry data. For example, the filter may strip the payload off of the packet and only include the packet's headers in the telemetry data.

At step 725, as detailed above, the switch may send the telemetry data to a traffic analysis service. Such a service may use the telemetry data for purposes of determining whether the endpoint device is infected with malware, which application or operating system is associated with the traffic, or the like. Procedure 700 then ends at step 730.

It should be noted that while certain steps within procedures 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce mechanisms that allow for the control over which traffic telemetry data is captured in an SDN and reported to a traffic analysis service. By tailoring the reported telemetry data to the metadata actually used by the analysis service, the amount of resources for the telemetry capture and reporting can be greatly reduced.

While there have been shown and described illustrative embodiments that provide packet metadata filtering, it is to be understood that various other adaptations and modifications may be made within the spirit and scope of the embodiments herein. For example, while certain embodiments are described herein with respect to using certain models for purposes of traffic analysis, the models are not limited as such and may be used for other functions, in other embodiments. In addition, while certain protocols are shown, such as TLS, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:

receiving, at a switch of a software-defined network (SDN), a packet sent by an endpoint device via the SDN, wherein the switch maintains one or more flow tables with entries indicative of one or more Transport Layer Security (TLS) header fields and that indicate whether and for how long a Transport Layer Security (TLS) packet is to be copied, wherein an entry in the entries comprises a particular ciphersuite, user agent, or TLS extension;

making, by the switch, a determination that one or more header fields of the packet match the particular ciphersuite, user agent, or TLS extension included in the one or more TLS header fields;

making, by the switch, a copy of the packet based on the determination;

forming, by the switch, telemetry data for reporting to a traffic analysis service by applying a metadata filter that applies a protocol-specific filtering policy that identifies TLS handshake messages and selectively extracts metadata from those packets, and that truncates the copy of the packet, by the switch and without decrypting a payload, by preventing the payload of the copy from inclusion in the telemetry data and causing only one or more header fields of the copy to be included in the telemetry data;

applying, by the switch, header compression to the telemetry data before sending the telemetry data to the traffic analysis service; and sending, by the switch, the telemetry data to the traffic analysis service, wherein the traffic analysis service comprises a classifier configured to use the telemetry data to classify the endpoint device for security analysis, including determining whether the endpoint device is infected with malware, to cause one or more mitigation actions to be performed by the traffic analysis service on the endpoint device when infected with malware.

2. The method as in claim 1, wherein the traffic analysis service uses the telemetry data to determine whether the endpoint device is infected with malware.

3. The method as in claim 1, wherein forming the telemetry data further comprises:

applying header compression to the copy of the packet.

4. The method as in claim 1, further comprising:

receiving, at the switch, an update to the one or more flow tables and to the metadata filter from an SDN controller.

5. The method as in claim 1, wherein the metadata filter determines whether the packet is one of a set of initial packets for a Transmission Control Protocol (TCP) session.

6. The method as in claim 1, wherein the telemetry data comprises header information from the copy of the packet and one or more other packets sent by the endpoint device.

7. The method as in claim 1, wherein the traffic analysis service comprises a classifier that takes the telemetry data as input to determine whether a flow associated with the packet sent by the endpoint device is malware-related, an attempt to exfiltrate traffic, or follows authorized security parameters.

8. The method as in claim 1, wherein the packet sent by the endpoint device is from a TLS handshake.

9. An apparatus, comprising:

one or more network interfaces to communicate with a software-defined network (SDN);

a processor coupled to the one or more network interfaces and configured to execute one or more processes; and a memory configured to store a process executable by the processor, the process when executed configured to:

receive, as a switch in the SDN, a packet sent by an endpoint device via the SDN, wherein the switch maintains one or more flow tables with entries indicative of one or more Transport Layer Security (TLS) header fields and that indicate whether and for how long a Transport Layer Security (TLS) packet is to be copied, wherein an entry in the entries comprises a particular ciphersuite, user agent, or TLS extension;

make a determination that one or more header fields of the packet match the particular ciphersuite, user agent, or TLS extension included in the one or more TLS header fields;

make a copy of the packet based on the determination;

form telemetry data for reporting to a traffic analysis service by applying a metadata filter that applies a protocol-specific filtering policy that identifies TLS handshake messages and selectively extracts metadata from those packets, and that truncates the copy of the packet, by the switch and without decrypting a payload, by preventing the payload of the copy from inclusion in the telemetry data and causing only one or more header fields of the copy to be included in the telemetry data;

applying, by the switch, header compression to the telemetry data before sending the telemetry data to the traffic analysis service; and send the telemetry data to the traffic analysis service, wherein the traffic analysis service comprises a classifier configured to use the telemetry data to classify the endpoint device for security analysis, including determining whether the endpoint device is infected with malware, to cause one or more mitigation actions to be performed by the traffic analysis service on the endpoint device when infected with malware.

10. The apparatus as in claim 9, wherein the traffic analysis service uses the telemetry data to determine whether the endpoint device is infected with malware.

11. The apparatus as in claim 9, wherein the apparatus forms the telemetry data further by:

applying header compression to the copy of the packet.

12. The apparatus as in claim 9, wherein the process when executed is further configured to:

receive an update to the one or more flow tables and to the metadata filter from an SDN controller.

13. The apparatus as in claim 9, wherein the metadata filter determines whether the packet is one of a set of initial packets for a Transmission Control Protocol (TCP) session.

14. The apparatus as in claim 9, wherein the telemetry data comprises header information from the copy of the packet and one or more other packets sent by the endpoint device.

15. The apparatus as in claim 9, wherein the apparatus comprises a network switch.

16. The apparatus as in claim 9, wherein the traffic analysis service comprises a classifier that takes the telemetry data as input to determine whether a flow associated with the packet sent by the endpoint device is malware-related, an attempt to exfiltrate traffic, or follows authorized security parameters.

17. The apparatus as in claim 9, wherein the packet sent by the endpoint device is from a TLS handshake.

18. A tangible, non-transitory, computer-readable medium storing program instructions that cause a switch in a software-defined network (SDN) to execute a process comprising:

receiving, at a switch of a software-defined network (SDN), a packet sent by an endpoint device via the SDN, wherein the switch maintains one or more flow tables with entries indicative of one or more Transport Layer Security (TLS) header fields and that indicate whether and for how long a Transport Layer Security (TLS) packet is to be copied, wherein an entry in the entries comprises a particular ciphersuite, user agent, or TLS extension;

making, by the switch, a determination that one or more header fields of the packet match the particular ciphersuite, user agent, or TLS extension included in the one or more TLS header fields;

making, by the switch, a copy of the packet based on the determination;

forming, by the switch, telemetry data for reporting to a traffic analysis service by applying a metadata filter that applies a protocol-specific filtering policy that identifies TLS handshake messages and selectively extracts metadata from those packets, and that truncates the copy of the packet, by the switch and without decrypting a payload, by preventing the payload of the copy from inclusion in the telemetry data and causing only one or more header fields of the copy to be included in the telemetry data;

applying, by the switch, header compression to the telemetry data before sending the telemetry data to the traffic analysis service; and sending, by the switch, the telemetry data to the traffic analysis service, wherein the traffic analysis service comprises a classifier configured to use the telemetry data to classify the endpoint device for security analysis, including determining whether the endpoint device is infected with malware, to cause one or more mitigation actions to be performed by the traffic analysis service on the endpoint device when infected with malware.

19. The tangible, non-transitory, computer-readable medium as in claim 18, wherein the traffic analysis service comprises a classifier that takes the telemetry data as input to determine whether a flow associated with the packet sent by the endpoint device is malware-related, an attempt to exfiltrate traffic, or follows authorized security parameters.

20. The tangible, non-transitory, computer-readable medium as in claim 18, wherein the packet sent by the endpoint device is from a TLS handshake.

* * * * *